(12) United States Patent
Haggerty

(10) Patent No.: US 8,403,799 B2
(45) Date of Patent: Mar. 26, 2013

(54) AXLE ASSEMBLY INCLUDING DIFFERENTIAL LOCK AND BLOCKING MEMBER

(75) Inventor: Ian Neal Haggerty, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 584 days.

(21) Appl. No.: 12/616,189

(22) Filed: Nov. 11, 2009

(65) Prior Publication Data

US 2011/0108352 A1     May 12, 2011

(51) Int. Cl.
*F16H 48/20* (2012.01)
(52) U.S. Cl. ........................................... 475/231
(58) Field of Classification Search ............ 475/231, 475/249
See application file for complete search history.

(56) References Cited

U.S. PATENT DOCUMENTS

| | | | |
|---|---|---|---|
| 3,871,249 A * | 3/1975 | Jeffers | 475/86 |
| 5,024,309 A | 6/1991 | Takemura et al. | |
| 5,277,028 A | 1/1994 | Worner et al. | |
| 5,451,188 A | 9/1995 | Kraft et al. | |
| 6,705,966 B2 | 3/2004 | Schröder et al. | |
| 7,364,211 B2 | 4/2008 | Niskanen et al. | |
| 2005/0198907 A1 | 9/2005 | McKnight et al. | |
| 2007/0137740 A1* | 6/2007 | Johnson et al. | 148/562 |
| 2007/0216194 A1 | 9/2007 | Rober et al. | |

* cited by examiner

*Primary Examiner* — David D Le
*Assistant Examiner* — Derek D Knight
(74) *Attorney, Agent, or Firm* — Ulmer & Berne LLP

(57) ABSTRACT

A differential lock assembly includes a differential lock and a blocking assembly. The differential lock assembly is movable between a locked position and an unlocked position. The blocking assembly is associated with the differential lock and includes a blocking member and a shape memory member. The blocking member is movable between a blocking position and a non-blocking position. When the blocking member is in the blocking position, the differential lock is inhibited from moving to the locked position. The shape memory member is coupled with the blocking member and configured to receive an activation signal. The shape memory member is configured for actuation between a first length and a second length in response to the activation signal, wherein actuation of the shape memory member between the first length and the second length facilitates movement of the blocking member between the non-blocking and blocking positions.

13 Claims, 11 Drawing Sheets

AXLE ASSEMBLY INCLUDING DIFFERENTIAL LOCK AND BLOCKING MEMBER

TECHNICAL FIELD

Vehicles are provided which include a differential lock and a blocking member that selectively inhibits operation of the differential lock.

BACKGROUND

Various motor vehicle differentials are known in the art. Differentials in two wheel drive vehicles are used to transfer torque from a driveshaft of a vehicle to a pair of driven axles to operate a pair of driven wheels, for example the left and right rear wheels of the vehicle. The differential permits the two driven axles to rotate at the same speed when the vehicle is traveling straight on a roadway and also permits the two axles to rotate at different speeds as required when the vehicle is turning or when traction is reduced at one of the driven wheels.

In some instances it is desirable to lock the differential to prevent the two axles from rotating at different speeds. For example, if one of the wheels loses traction and spins due to operation on a slippery surface such as ice, snow, sand, mud etc., the opposite wheel will lose torque in proportion to the traction lost by the spinning wheel. Consequently, the wheel opposite the spinning wheel may remain motionless and the vehicle is not propelled. Various devices are known that resolve this problem including differential locks.

One known differential lock is incorporated into a differential assembly. The differential lock includes a collar that is movable between unlocked and locked positions. In the unlocked position, the collar is splined to the differential but is disengaged from the axles so that the two driven axles are free to rotate at different speeds. In the locked position, the collar is splined to one of the axles and a rotatable carrier of the differential, which locks the differential. This prevents the two driven axles from rotating at different speeds during operation of the vehicle.

SUMMARY

In accordance with one embodiment, an axle assembly comprises an axle, a differential, a differential lock, and a blocking assembly. The differential is coupled with the axle and is configured to facilitate operation of the axle at an axle speed. The differential lock is associated with the differential and is movable between a locked position and an unlocked position. The blocking assembly is associated with the differential lock. The differential lock comprises a blocking member and a shape memory member. The blocking member is movable between a blocking position and a non-blocking position. When the blocking member is in the blocking position, the differential lock is inhibited from moving to the locked position. The shape memory member is coupled with the blocking member and is configured to receive an activation signal. The shape memory member is configured for actuation between a first length and a second length in response to the activation signal. Actuation of the shape memory member between the first length and the second length facilitates movement of the blocking member between the non-blocking and blocking positions.

In accordance with yet another embodiment, a differential lock assembly comprises a differential lock, a blocking assembly, and a controller. The differential lock is movable between a locked position and an unlocked position. The blocking assembly is associated with the differential lock and comprises a blocking member and a shape memory member. The blocking member is movable between a blocking position and a non-blocking position. When the blocking member is in the blocking position, the differential lock is inhibited from moving to the locked position. The shape memory member is coupled with the blocking member and is configured to receive an activation signal. The shape memory member is configured for actuation between a first length and a second length in response to the activation signal. Actuation of the shape memory member between the first length and the second length facilitates movement of the blocking member between the non-blocking and blocking positions. The controller is coupled with the blocking assembly and is configured to facilitate selective transmission of the activation signal to the shape memory member based upon a vehicular condition.

In accordance with yet another embodiment, a vehicle comprises a motive power source, an axle, a pair of wheels, a differential, a differential lock, a selector, a blocking assembly, and a controller. The axle is operably coupled with the motive power source. The pair of wheels is rotatably supported by the axle. The differential is coupled with the axle and is configured to facilitate operation of the axle at an axle speed. The differential lock is associated with the differential and is movable between a locked position and an unlocked position. The selector is coupled with the differential lock and is movable between a lock-initiate position and an unlock-initiate position. The blocking assembly is associated with the differential lock comprises a blocking member and a shape memory member. The blocking member is movable between a blocking position and a non-blocking position. When the blocking member is in the blocking position, the differential lock is inhibited from moving to the locked position. The shape memory member is coupled with the blocking member and is configured to receive an activation signal. The shape memory member is configured for actuation between a first length and a second length in response to the activation signal. Actuation of the shape memory member between the first length and the second length facilitates movement of the blocking member between the non-blocking and blocking positions. The controller is coupled with the blocking assembly and is configured to facilitate selective transmission of the activation signal to the shape memory member.

BRIEF DESCRIPTION OF THE DRAWINGS

Various embodiments will become better understood with regard to the following description, appended claims and accompanying drawings wherein:

DETAILED DESCRIPTION

Figure 1:
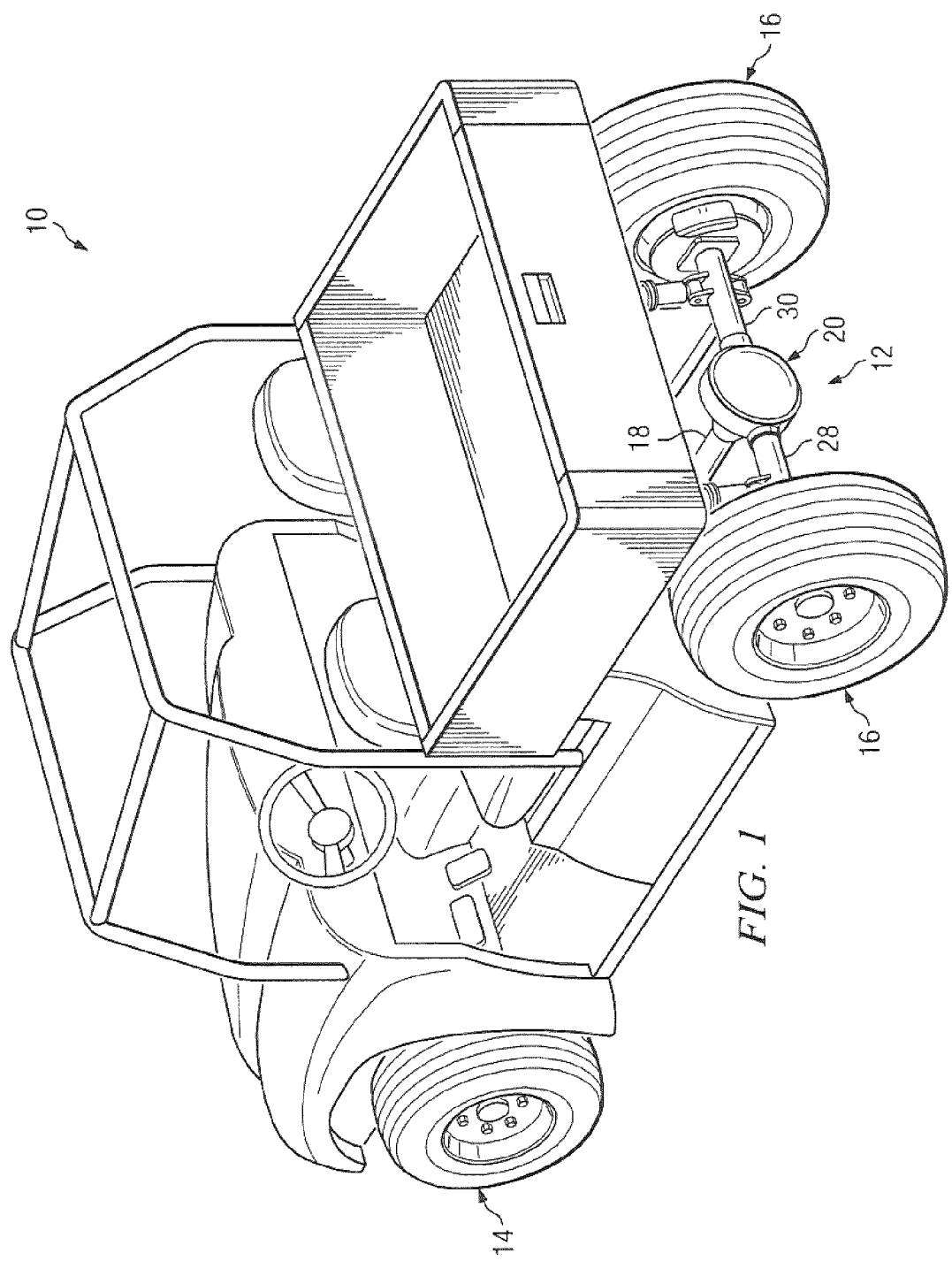
FIG. 1 is a left rear perspective view of a vehicle incorporating an axle assembly.

Referring to the drawings, wherein like reference numbers indicate the same or corresponding elements throughout the views, FIG. 1 illustrates a vehicle 10 that can incorporate an axle assembly 12 according to one embodiment. The axle assembly 12 can be provided on a small utility vehicle, such as vehicle 10 shown in FIG. 1 and can also be used on a variety of other vehicles including all terrain vehicles, golf carts, "dune buggies", automobiles, and trucks.

Vehicle 10 includes two front wheels 14 (one shown) and two rear wheels 16. Vehicle 10 also includes a source of motive power (not shown) and a drivetrain, which can include a driveshaft 18 and the axle assembly 12, for transferring torque from the source of motive power to the rear wheels 16. The source of motive power can be an internal combustion engine, which can use one or more of a variety of fuels, an electric motor or any other suitable source of motive power.

Figure 2:
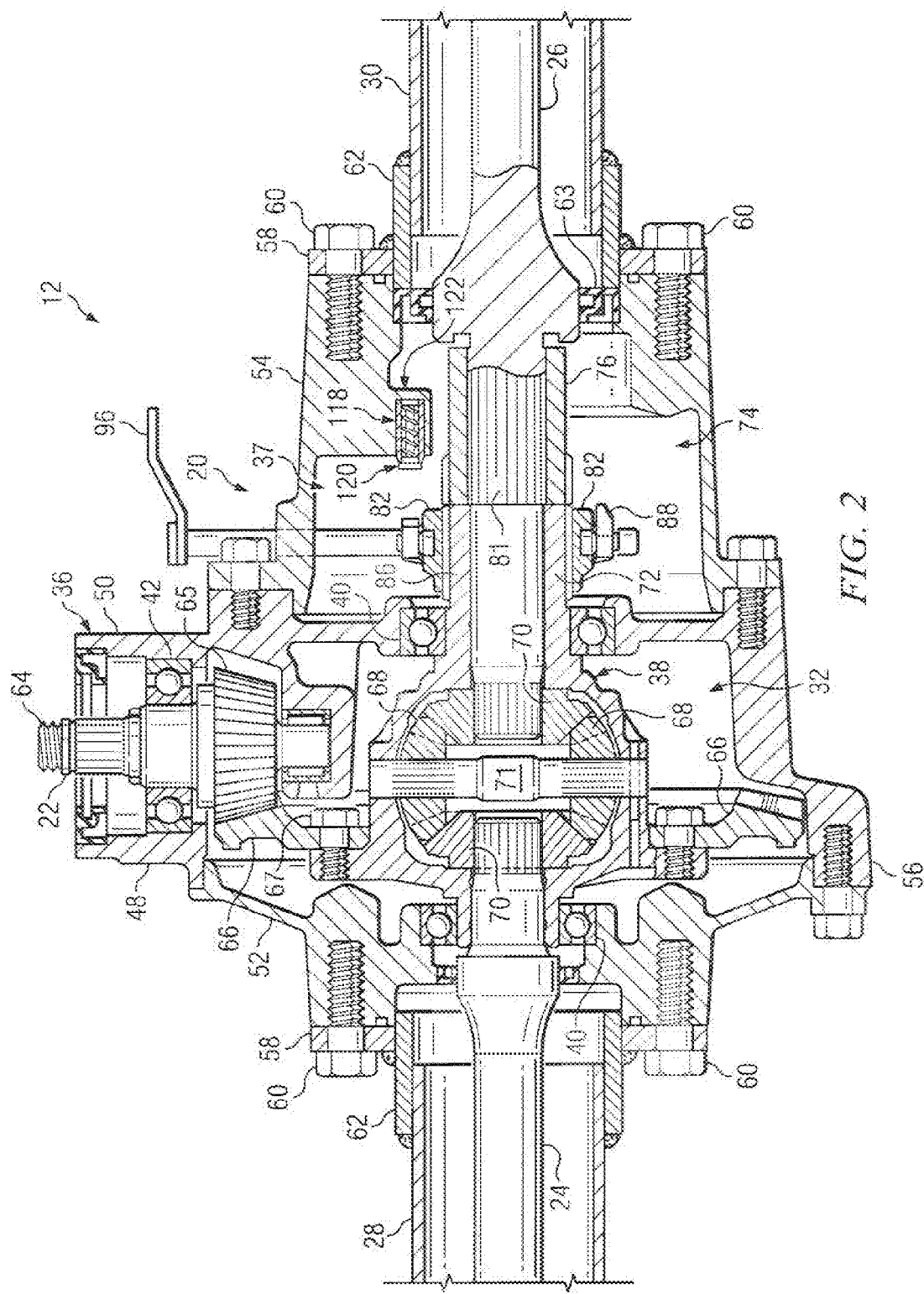
FIG. 2 is a cross-sectional view of the axle assembly shown schematically in FIG. 1, according to one embodiment, with a lock collar of a differential lock of the axle assembly in an unlocked position and a blocking member in a non-blocking position.
Figure 3:
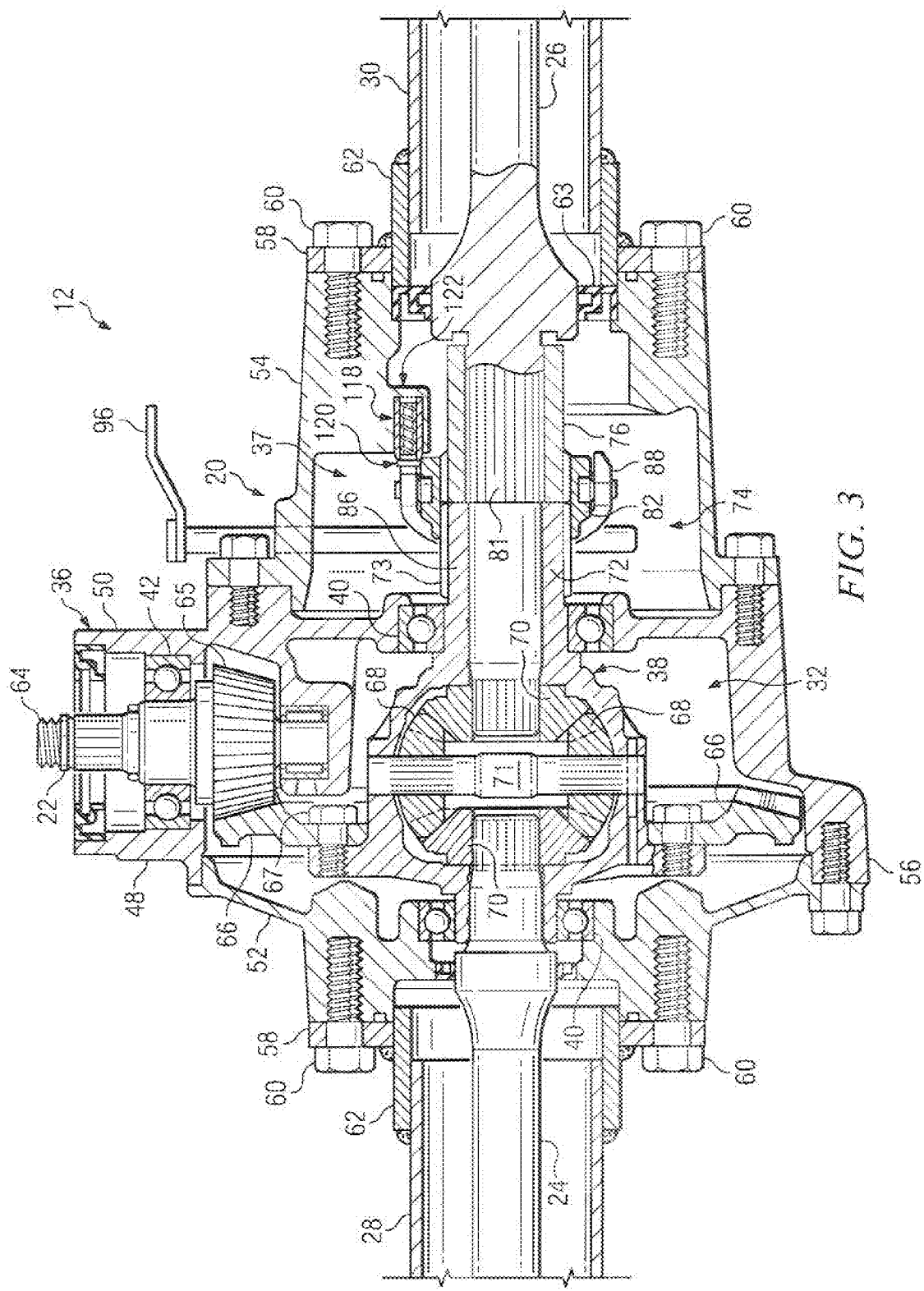
FIG. 3 is a cross-sectional view similar to FIG. 2, but with the lock collar in a locked position and the blocking member in a non-blocking position.
Figure 4:
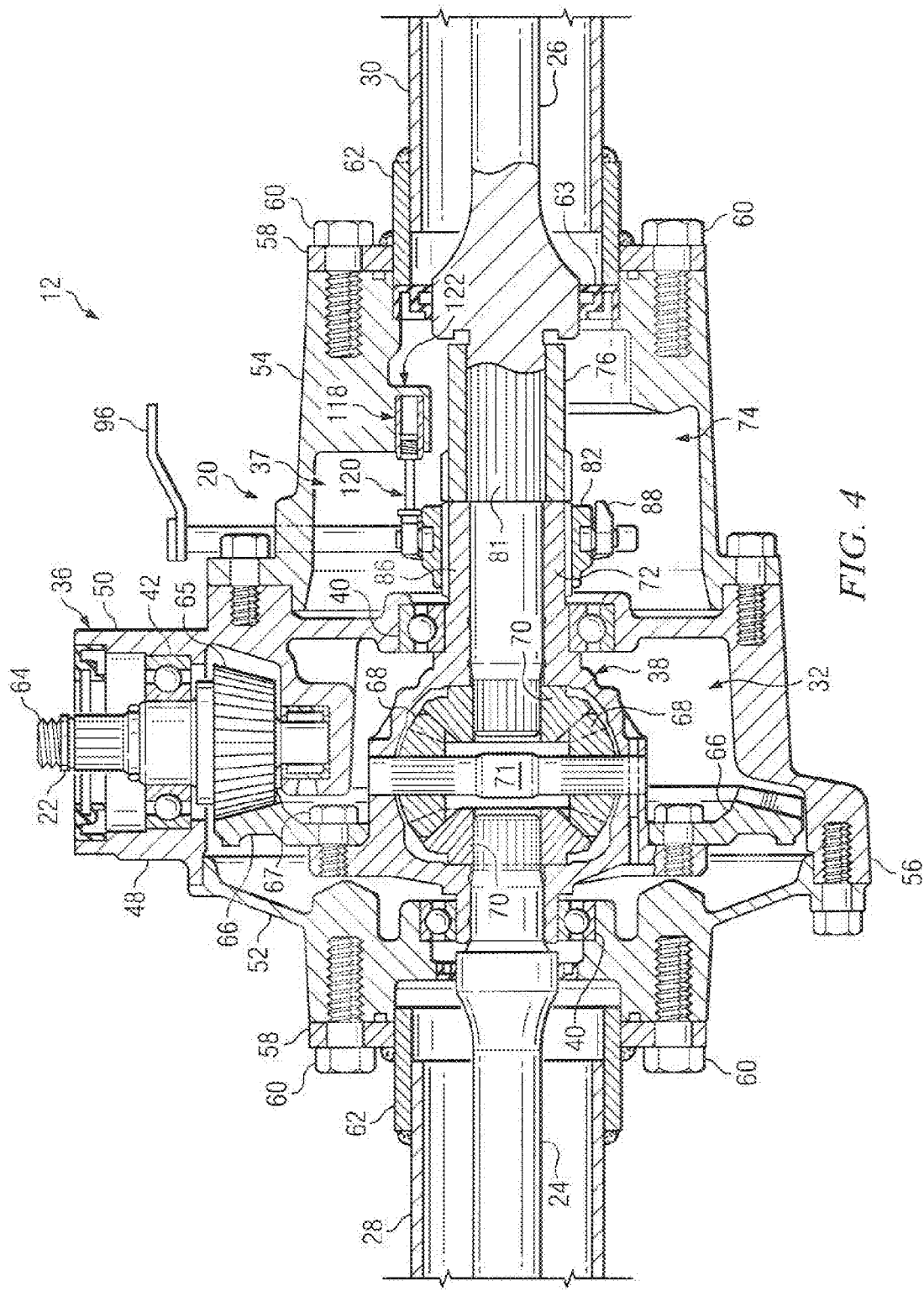
FIG. 4 is a cross-sectional view similar to FIG. 2, but with the lock collar in an unlocked position and the blocking member in a blocking position.

Referring to FIGS. 1-4, the axle assembly 12 can include a differential assembly 20, an input member 22 that can be coupled to the driveshaft 18, a left axle 24 and a right axle 26. Some components of axle assembly 12 are shown in elevation in FIGS. 2-4 for clarity of illustration, and axle assembly 12 is shown schematically in FIG. 1. In one embodiment, left and right axles 24 can be rotatable rear axles. Left axle 24 can be disposed within a stationary axle tube 28 and the right axle 26 can be disposed within a stationary axle tube 30 as shown in FIGS. 2-4 Left and right axles 24, 26 can be rotatably coupled with respective ones of the rear wheels 16 in a manner known in the art. While the differential assembly 20 is shown in FIG. 1 to be associated with rear axles (e.g., 24, 26), in an alternative embodiment, a differential assembly can be associated with front axles to facilitate operation of front wheels, for example.

The differential assembly 20 can include a differential 32 and a housing 36. The differential 32 can be supported within a fluid receptacle 37 that is defined by the housing 36. As is common, differential fluid (e.g., differential oil) can be provided within the fluid receptacle 37 to lubricate the differential 32 during operation. The differential 32 can include a rotatable carrier 38 that can be journalled within the housing 36 by a pair of bearings 40. The rotatable carrier 38 can be rotatably coupled with input member 22 and left and right axles 24, 26 as subsequently described in greater detail. The input member 22 can be journalled within the housing 36 by a bearing 42. During operation of the vehicle 10, the differential 32 transfers torque from the input member 22 to the left axle 24 and the right axle 26.

The housing 36 can include multiple members. For example, the housing 36 can include members 48, 50 that cooperate to define an opening suitable to permit input member 22 to extend through housing 36. The bearing 42 can be positioned between the input member 22 and both of the members 48, 50 of housing 36. The housing 36 can also include a member 52 which journals the left one of bearings 40 and members 54 and 56, which can be connected to one another. Members 50 and 56 can cooperate to journal the right one of bearings 40.

Differential assembly 20 can include a pair of covers 58. The covers 58 can be fastened to the housing 36 using conventional fasteners such as bolts 60. The differential assembly 20 can also include a pair of sleeves 62, with one of the sleeves 62 co-axially disposed about the axle tube 28 and secured to the axle tube 28, for example by welding. The other sleeve 62 can be co-axially disposed about the axle tube 30 and secured to the axle tube 30, for example by welding. Differential assembly 20 can also include a seal 63 that can be annularly disposed between the right axle 26 and the housing 36 of the differential 32, as shown in FIGS. 2-4. Seal 63 can be effective for retaining, or at least substantially retaining, differential fluid within the fluid receptacle 37.

The input member 22 can be coupled at a first end 64 to the drive shaft 18. The opposite end of the input member 22 can include a pinion gear 65 that meshes with a ring gear 66 that can be secured to the rotatable carrier 38 by conventional fasteners such as a plurality of bolts (e.g., bolts 67). Accordingly, during operation of vehicle 10, rotation of driveshaft 18 can cause the input member 22 to rotate (e.g., at an input speed), which, in turn, can cause rotation of the rotatable carrier 38. The differential assembly 20 can further include a set of differential gears that can include a plurality of spider gears 68 and a pair of side gears 70. The spider gears 68 can be secured to a shaft 71 which is secured to the rotatable carrier 38. Accordingly, the spider gears 68 can be rotatable with the rotatable carrier 38. Each spider gear 68 can mesh with both of the side gears 70.

As shown in FIGS. 2-4, one of the side gears 70 can be secured to an inboard end of the right axle 26, while the other side gear 70 can be secured to an inboard end of the left axle 24. In one embodiment, the side gears 70 can be splined to the respective one of the left and right axles 24, 26. Accordingly, it may be appreciated that rotation of the rotatable carrier 38 can cause the left and right axles 24, 26 to rotate, which in turn can rotate the associated wheels (e.g., rear wheels 16). As known in the art, when the differential 32 is unlocked, spider gears 68 cooperate with the side gears 70 so that the axles 24 and 26 can rotate at the same speed when the vehicle 10 is traveling straight on a roadway and also cooperate to permit axles 24 and 26 to rotate at different axle speeds as required when the vehicle 10 is turning or when traction is reduced at one of the associated wheels.

The rotatable carrier 38 can include a sleeve 72 that is sized to receive the right axle 26. The sleeve 72 of the rotatable carrier 38 can include a plurality of circumferentially spaced external splines (e.g., 73 shown in FIGS. 3 and 4).

Axle assembly 12 can further include a differential lock 74, as illustrated in FIGS. 2-4, and 8. The differential lock 74 permits the operator of vehicle 10 to selectively lock differential 32 to prevent the left and the right axles 24, 26 from rotating relative to one another, and accordingly, to prevent the two wheels from rotating relative to one another. This can be desirable in certain instances, for example when one of the rear wheels 16 is spinning due to engagement with a slippery surface such as ice, snow, sand, mud etc.

Figure 5:
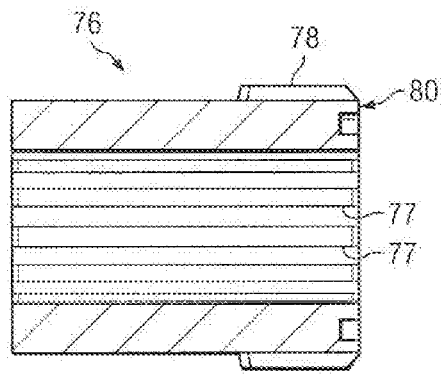
FIG. 5 is an enlarged cross-sectional view of the lock sleeve shown in FIGS. 2-4.

The differential lock 74 can include a lock sleeve 76. As illustrated in FIG. 5, the lock sleeve 76 can have a plurality of circumferentially spaced internal splines 77 and a plurality of circumferentially spaced external splines 78. The lock sleeve 76 can be co-axially disposed about the right axle 26. In other embodiments (not shown), the differential lock 74 can be associated with the left axle 24. Additionally, it will be appreciated that in other vehicles having a front differential and driven front wheels, the differential lock 74 can be associated with either one of the driven front axles.

Figure 6:
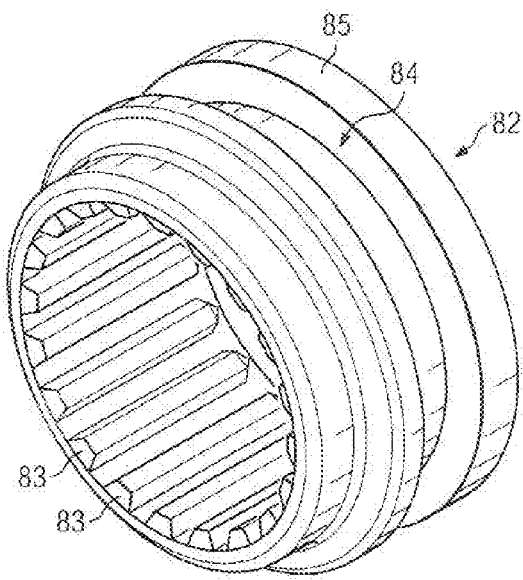
FIG. 6 is an enlarged perspective view of the lock collar shown in FIGS. 2-4.

The lock sleeve 76 can be splined to the right axle 26, with the internal splines 77 of lock sleeve 76 meshed with external splines 81 of the right axle 26. Accordingly, lock sleeve 76 can be rotatable with the right axle 26. The differential lock 74 can also include a lock collar 82 that is co-axially disposed about the sleeve 72. As illustrated in FIG. 6, the lock collar 82 can include a plurality of circumferentially spaced internal splines 83 and an annular groove 84 defined by an outer surface 85 of the lock collar 82.

Figure 7:
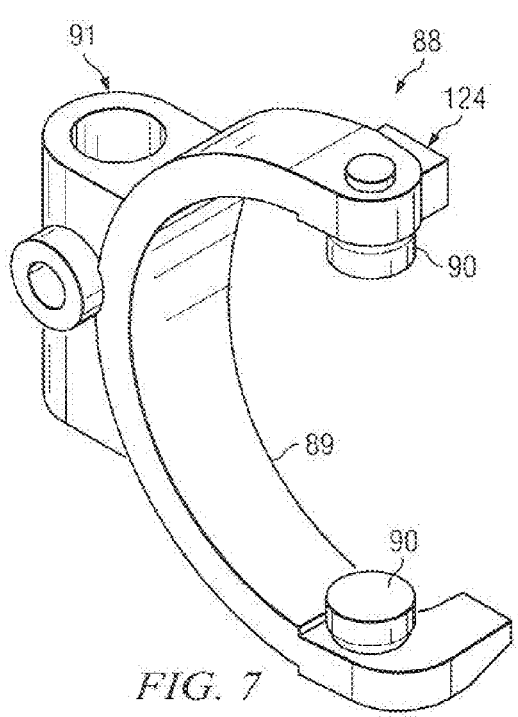
FIG. 7 is an enlarged perspective view of the lock fork shown in FIGS. 2-4.

The lock collar 82 is laterally movable relative to the lock sleeve 76 of the differential lock 74 and the sleeve 72 of the rotatable carrier 38 between an unlocked position (e.g., as illustrated in FIG. 2) and a locked position (e.g., as illustrated in FIG. 3). Lock collar 82 can be moved between the locked and unlocked positions by a lock fork 88 that engages the lock collar 82. As shown in FIG. 7, lock fork 88 can include a circumferentially extending member 89 that can extend partially around the lock collar 82. For example, in one embodiment the circumferentially extending member 89 can encircle about one-half of the circumference of lock collar 82. The lock fork 88 can further include a plurality of protrusions 90 that extend radially inwardly from the circumferentially extending member 89. The protrusions 90 can be disposed within the circumferentially extending groove 84 of lock collar 82. Lock fork 88 can also include an attachment member 91.

When the lock collar 82 is in the unlocked position as shown in FIG. 2, the lock collar 82 is engaged with the sleeve 72 for rotation with the rotatable carrier 38, but is disengaged from the lock sleeve 76. When lock collar 82 is in the unlocked position, the internal splines 83 of lock collar 82 are meshed with the external splines 73 of the sleeve 72. Movement of the differential lock 74 to an unlocked position can facilitate movement of the lock collar 82 to the unlocked position as shown in FIG. 2 such that the differential 32 is "unlocked" and the right axle 26 and the left axle 24 are free to rotate relative to the rotatable carrier 38 and are also free to rotate relative to one another.

When the lock collar 82 is in the locked position as shown in FIG. 3, the lock collar 82 can be engaged with both the sleeve 72 of the rotatable carrier 38 and the lock sleeve 76. In this position, the internal splines 83 of lock collar 82 can be meshed with the external splines 73 of the sleeve 72 of the rotatable carrier 38 and can also be meshed with the external splines 78 of lock sleeve 76, which locks the differential 32. Accordingly, when the lock collar 82 is in the locked position shown in FIG. 3, the lock sleeve 76, the rotatable carrier 38 and the right axle 26 can rotate at the same speed when the vehicle 10 is in operation. Additionally, when lock collar 82 is in the locked position, the left axle 24 can be prevented from rotating relative to rotatable carrier 38 and the right axle 26. Consequently, left and right, axles 24, 26 and respective associated wheels can rotate at the same speed during operation of vehicle 10, when the lock collar 82 is in the locked position (e.g., shown in FIG. 3). Movement of the differential lock 74 to a locked position can facilitate movement of the lock collar 82 to the locked position as shown in FIG. 3 such that the differential 32 is "locked".

Figure 8:
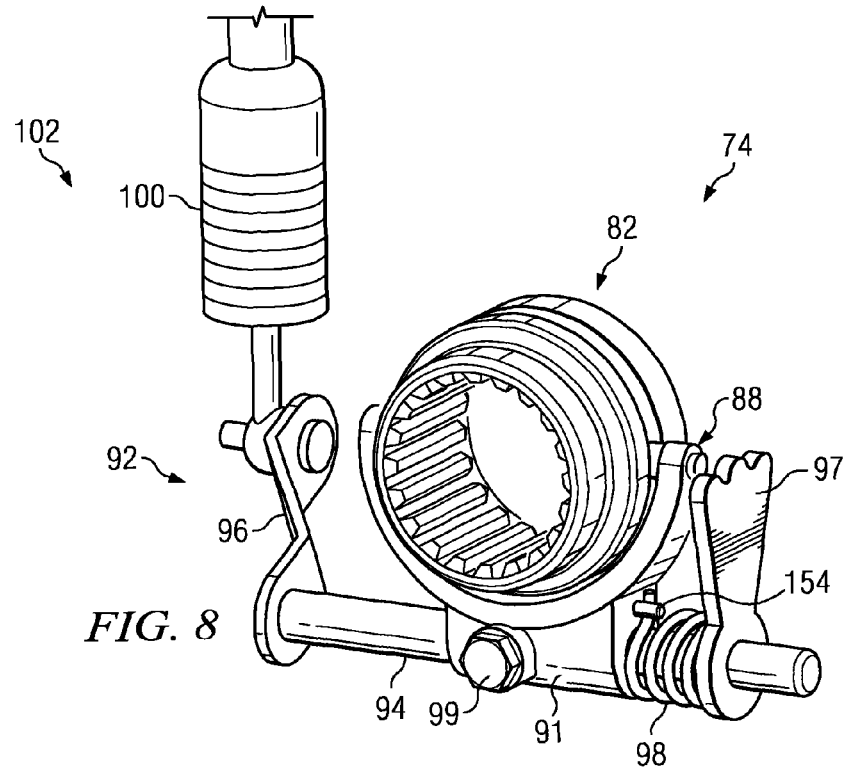
FIG. 8 is an enlarged perspective view of the differential lock assembly of FIGS. 2-4 depicting a differential lock cable associated with the differential lock assembly, according to one embodiment.

As illustrated in FIG. 8, the differential lock 74 can include a shift assembly 92. The shift assembly 92 can include a shaft 94, a shift aim 96, a stop member 97, and a resilient member 98. The attachment member 91 can be coupled with the shaft 94. In one embodiment, the attachment member 91 can be selectively secured to the shaft 94 with a bolt 99. One end of the shaft 94 can be coupled with the stop member 97 (e.g., through welding). The other end of the shaft 94 can be coupled with the shift arm 96. The shift arm 96 can be coupled with a differential lock cable 100 that can be associated with a selector 102.

Figure 9:
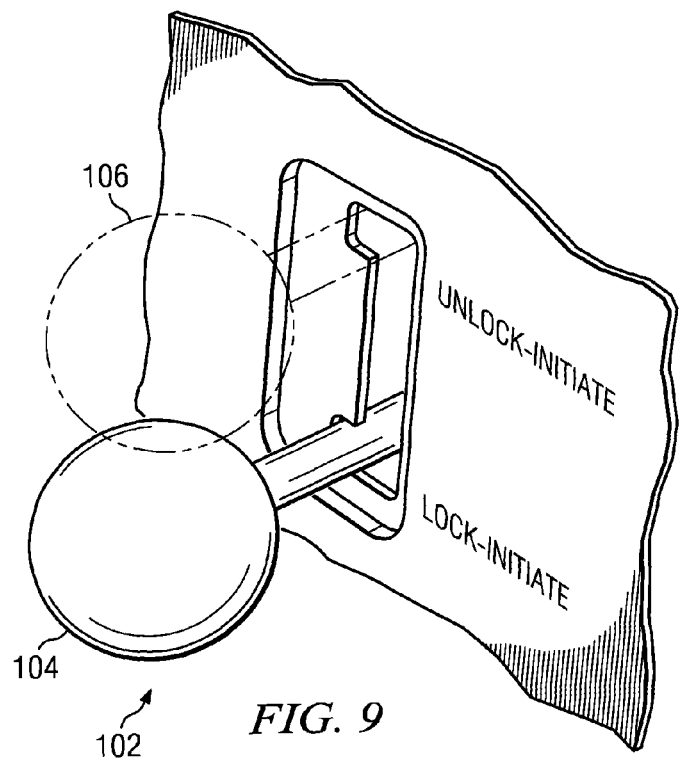
FIG. 9 is a perspective view of a selector, according to one embodiment, wherein the selector is depicted in a locked position and an unlocked position.

The selector 102 can facilitate control of the differential lock 74 by an operator of the vehicle 10. The selector 102 can be moved into a lock-initiate position when the operator wants to lock the differential 32. The selector 102 can be moved into an unlock-initiate position when the operator wants to unlock the differential 32. In one embodiment, the selector 102 can be mounted within reach of an operator such as along an interior console of a vehicle such that the operator can manually actuate the selector 102 between the lock-initiate position and the unlock-initiate position. As illustrated in FIG. 9, in one embodiment, the selector 102 can include a differential lock lever that is movable between a lock-initiate position 104 and an unlock-initiate position 106.

Figure 10:
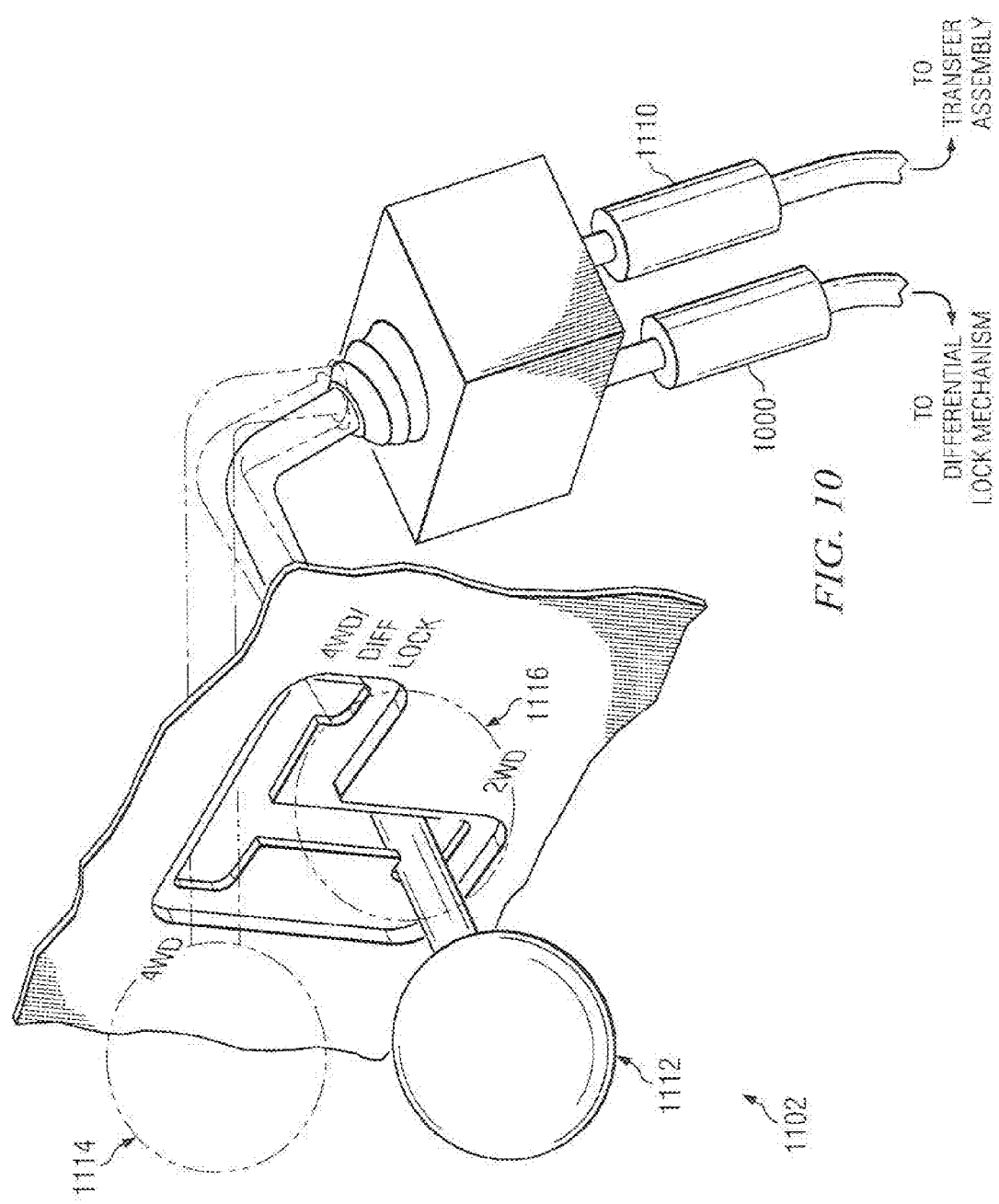
FIG. 10 is a perspective view of a selector, according to another embodiment, wherein the selector is depicted in a 2WD position, a 4WD position, and a 4WD/Differential Lock position.

In an alternative embodiment, as illustrated in FIG. 10, a selector 1102 can comprise a two-wheel drive (2WD)/four-wheel drive (4WD) lever. The selector 1102 can be operably coupled with the differential lock cable 1000 and a transfer assembly cable 1110. The selector 1102 can be movable between a 2WD position 1112, a 4WD position 1114, and a 4WD/differential lock position 1116. In such an arrangement, an operator can move the 2WD/4WD lever 1114 between the 2WD, 4WD, and 4WD/differential lock positions 1112, 1114, and 1116 to facilitate 2WD or 4WD operation of the vehicle 10. For example, when the selector 1102 is moved to the 2WD position 1112, the vehicle 10 operates in 2WD (e.g., either the front or rear wheels 14, 16 are driven by the source of motive power). When the selector 1102 is moved to either the 4WD position 1114 or the 4WD/differential lock position 1116, the vehicle 10 operates in 4WD (e.g., the front and rear wheels 14, 16 are driven by the engine). It will be appreciated that movement of the selector 1102 between the 2WD, 4WD and 4WD/differential lock positions, 1112, 1114, 1116 can also facilitate simultaneous control of the differential lock 74. Therefore, in each of the positions 1112, 1114, 1116, the selector 1102 can satisfy two conditions. For example, the selector 1102 can be in an unlock-initiate position when in the 2WD position 1112 or the 4WD position 1114. Conversely, the selector 1102 can be in a lock-initiate position when in the 4WD/differential lock position 1116.

It will be appreciated that a selector can comprise a pushbutton, a rotary switch, or toggle switch, a relay, solid state device, or any of a variety of other suitable devices or components. It will be appreciated that, with respect to a solid state device, a "position" of the selector can comprise a state of the solid state device.

The differential assembly 20 can include a blocking assembly 118 (e.g., FIGS. 2-4) associated with the differential lock 74 and configured to inhibit locking of the differential 32. The blocking assembly 118 can include a blocking member 120. As illustrated in FIGS. 2-4, the blocking member 120 can be movable between a non-blocking position (e.g., FIGS. 2 and 3) and a blocking position (e.g., FIG. 4). When the blocking member 120 is in the non-blocking position, the lock collar 82 can move between the unlocked and locked position. However, when the blocking member 120 is moved to the blocking position, the blocking member 120 contacts the locking collar 82 to inhibit the locking collar 82 from moving to the locked position.

The blocking assembly 118 is shown to be positioned within a bore of a shoulder 122 (e.g., in a press fit arrangement) that is defined by the member 54 of housing 36 such that the blocking member 120 is supported adjacent to the lock collar 82. The lock fork 88 can include a contact pad 124 (shown in FIG. 7) that is provided adjacent the blocking member 120. In such an arrangement, when the blocking member 120 is moved to the blocking position, it can contact the contact pad 124 and inhibit the differential lock 74 from locking (e.g., inhibit the lock fork 88 from moving the locking collar 82 to the locked position). It will be appreciated, however, that a blocking assembly 118 can be associated with a differential lock in any of a variety of other suitable locations that facilitate inhibiting locking of a differential.

Figure 11:
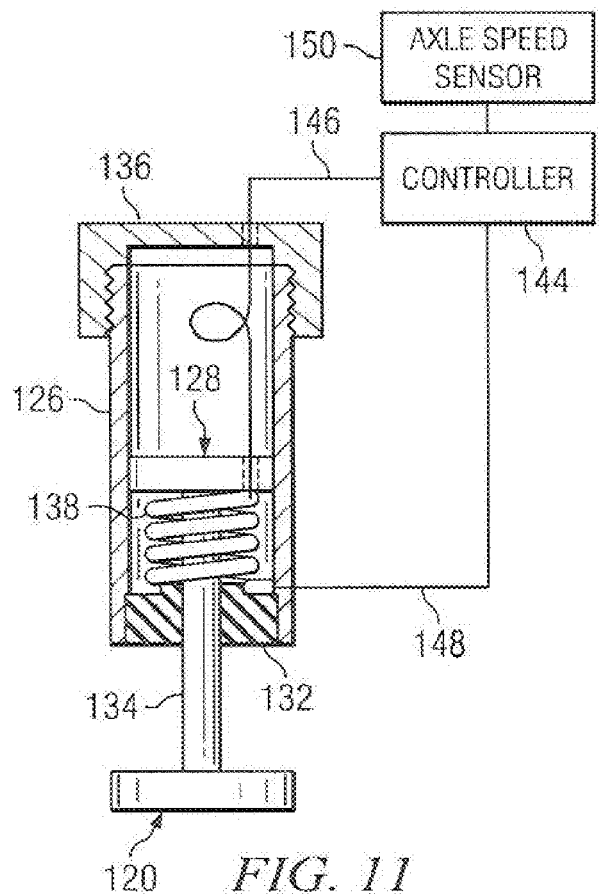
FIGS. 11 and 12 are cross-sectional views of a blocking assembly, according to one embodiment, wherein a shape memory member is associated with the blocking member and is coupled with a controller and wherein the blocking member is shown in respective blocking, and non-blocking positions.

As illustrated in FIG. 11, in one embodiment, the blocking assembly 118 can include a sleeve 126. A first end 128 of the blocking member 120 can be disposed within the sleeve 126 and can be configured to slide along an inner surface 130 of the sleeve 126. The blocking assembly 118 can include a seal 132 that is annularly disposed between a shaft 134 of the blocking member 120 and the sleeve 126. The blocking assembly 118 can also include a cap 136 that is threaded on an end of the sleeve 126 that is opposite the seal 132. The seal 132 and the cap 136 can be effective for retaining, or at least substantially retaining, lubricating fluid within the sleeve 126 to reduce friction between interfacing surfaces of the blocking member 120 and the sleeve 126 during movement of the blocking member 120. The cap 136 can also be effective for accessing the blocking member 120, the seal 132, and certain other components of the blocking assembly 118 that are disposed within sleeve 126 (e.g., for maintenance on the blocking assembly 118).

The blocking assembly 118 can further include a shape memory member 138 coupled with the blocking member 120. In one embodiment, as illustrated in FIG. 11, the shape memory member 138 can be a coiled member that includes a first end 140 and a second end 142. The shape memory member 138 can wind around the shaft 134 of the blocking member 120. The first end 140 of the shape memory member 138 can be coupled with the first end 128 of the blocking member 120 and the second end 142 of the shape memory member 138 can be coupled with the sleeve 126.

Figure 12:
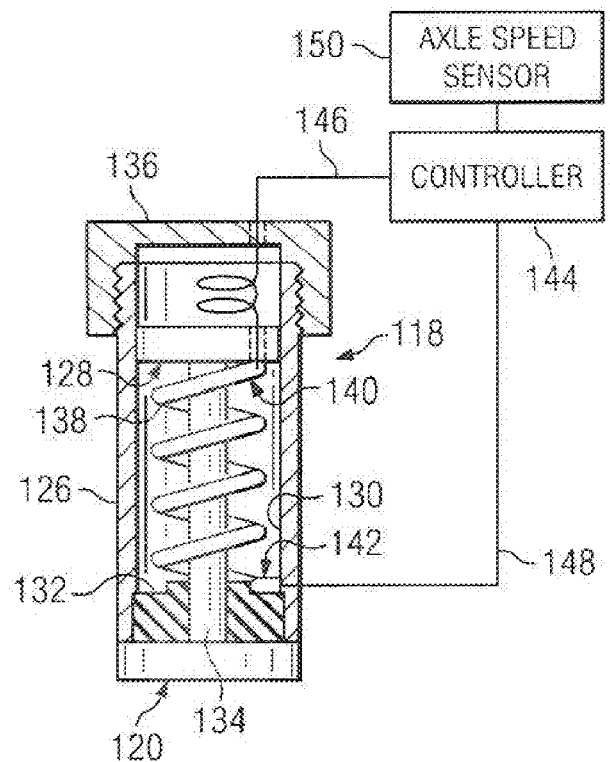

The shape memory member 138 can be configured for actuation between a first length and a second length. Actuation of the shape memory member 138 between the first length and second length can facilitate movement of the blocking member 120 between the blocking and non-blocking positions. For example, as illustrated in FIG. 11, when the shape memory member 138 contracts to the first length, the blocking member 120 can be moved to the blocking position. As illustrated in FIG. 12, when the shape memory member 138 extends to the second length, the blocking member 120 can be moved to the non-blocking position.

The shape memory member 138 can be configured for actuation between the first length and the second length in response to an activation signal. In one embodiment, the shape memory member 138 can be configured for actuation in response to a heat signal. In such an embodiment, the shape memory member 138 can be selectively heated to actuate the shape memory member 138 between the first length and the second length. For example, as illustrated in FIG. 11, when the shape memory member 138 is heated it can contract to a first length. However, as illustrated in FIG. 12, when the shape memory member 138 is no longer heated, it can extend to a longer (e.g., second) length.

A controller 144 can be coupled with the blocking assembly 118 and configured to facilitate selective transmission of the activation signal to the shape memory member 138. In one embodiment, the controller 144 can be configured to selectively induce an electrical current through the shape memory member 138 to actuate the shape memory member 138. For example, as illustrated in FIGS. 11 and 12, a first lead 146 can be coupled with the first end 140 of the shape memory member 138 and a second lead 148 can be coupled with the second end 142 of the shape memory member 138. The controller 144 can be coupled with the first and second leads 146, 148. When the controller 144 induces electrical current through the shape memory member 138, the shape memory member 138 can heat up and contract to a first, length, as illustrated in FIG. 11. However, if the controller 144 disables the electrical current, the shape memory member 138 can cool down and extend to the second length, as illustrated in FIG. 12. The controller 144 however, can be configured to otherwise heat a shape memory member. For example, in lieu of being coupled to a shape memory member with leads (e.g., 146, 148), the controller 144 can be coupled with a heating element that is associated with the blocking assembly 118. The controller 144 can selectively activate the heating element to heat the shape memory member.

It will be appreciated that a shape memory member can be comprised of any of a variety of shape memory materials that are responsive activation signals (e.g., light, electric fields, magnetic fields, heat, or a PH level). For example, a shape memory member can comprise any of a variety of heat-responsive shape memory materials such as a heat-responsive shape memory alloy (e.g., a copper-zinc-aluminum-nickel alloy, a copper-aluminium-nickel alloy, a nickel-titanium alloy, and/or a ferromagnetic alloy) or a thermoactive shape memory polymer (e.g., thermoplastic polymeric material or a linear block copolymer), for example. It will also be appreciated that the shape memory member can include shape memory alloys, shape memory polymers, and/or other shape memory materials. The controller 144 can therefore be configured to a actuate shape memory member with an electromagnet, a light source, or any of a variety of other suitable means for facilitating transmission of an activation signal to control a shape memory member.

It will be appreciated that, when the one of the axles (e.g., 24, 26) are operating above a particular axle speed (e.g., an axle speed that facilitates a vehicle speed of about 6 M.P.H.), movement of the lock collar 82 may harm the certain components of the axle assembly 12 (e.g., the differential 32). The controller 144 can therefore be configured to control the blocking assembly 118 according to the axle speed of the vehicle 10. As illustrated in FIGS. 11 and 12, the controller 144 can be coupled with an axle speed sensor 150. The axle speed sensor 150 can be associated with one of the left or right axles 24, 26 and can be configured to detect axle speed. During operation of the vehicle, the controller 144 can be configured to compare the detected axle speed to a threshold value. When the detected axle speed is below the threshold value, the controller 144 can disable an activation signal to the shape memory member 138. The blocking member 120 can accordingly be provided in the non-blocking position, as illustrated in FIGS. 2, 3 and 12, thereby allowing the differential 32 to be locked. However, once the axle speed exceeds the threshold value, the controller 144 can enable the activation signal to move the blocking member 120 to the blocking position, as illustrated in FIGS. 4 and 11, to prevent the differential 32 from being locked.

It will be appreciated that the controller 144 can additionally or alternatively control the blocking assembly 118 according to any of a variety of vehicular conditions such as to prevent locking of the differential 32 when movement of the differential lock 74 (e.g., the lock collar 82) could harm the differential 32. In one example, when a temperature of the differential fluid is too hot (e.g., exceeds a threshold temperature of about 200° F.) movement of the lock collar 82 can harm the differential 32. Therefore, when the temperature of the differential fluid exceeds the threshold temperature, the blocking member 120 of the blocking assembly 118 can be moved to the blocking position to inhibit locking of the differential 32. In another example, when a temperature of the differential fluid is too cold (e.g., below a threshold temperature of about 0° F.) movement of the lock collar 82 can harm the differential 32. Therefore, if the temperature of the differential fluid is below a threshold temperature, the blocking member 120 of the blocking assembly 118 can be moved to the blocking position to inhibit locking of the differential 32. In another example, when the difference between the speeds of each axle exceeds a threshold value (e.g., the left wheel is spinning about twice as fast as the right wheel) movement of the lock collar 82 may harm the differential 32. Therefore, if the difference between the axle speed of the left and right axles exceeds the threshold value, the blocking member 120 of the blocking assembly 118 can be moved to the blocking position to inhibit locking of the differential 32. In yet another example, moving the lock collar 82 may harm the differential 32 when the axle assembly 12 is malfunctioning (e.g., the vehicle 10 is in a "Limp Home" mode). Therefore, if the axle assembly 12 is malfunctioning, the blocking member 120 of the blocking assembly 118 can be moved to the blocking position to inhibit locking of the differential 32. It will be appreciated that the blocking assembly 118 can be controlled to prevent locking of the differential 32 according to any of a variety of suitable alternative vehicular conditions. It will also be appreciated that the particular threshold value for each vehicular condition may be vehicle-dependent and can therefore depend upon particular operating characteristics of a vehicle.

It will be appreciated that the controller 144 can be coupled with any of a variety of sensors that are configured to detect particular vehicular conditions. It will also be appreciated that a controller can be provided upon a vehicle in any of a variety of suitable locations and configurations. The controller can be a stand alone controller or can alternatively be integrated into a vehicular controller such as an electronic control unit (ECU), for example. It will also be appreciated that the controller can be configured to implement any of a variety of suitable control routines or functionality. For example, the controller can be configured to disable the activation signal when the vehicular condition is below the threshold value with the selector 102 in the locked position.

Figure 13:
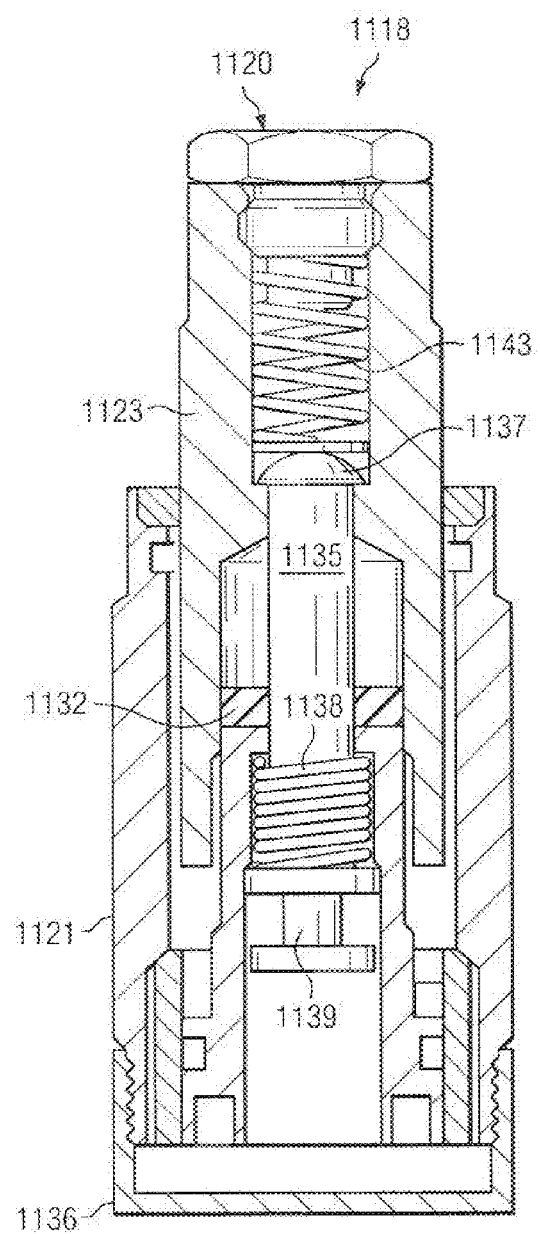
FIGS. 13 and 14 are cross-sectional views of a blocking assembly, according to another embodiment, wherein a shape memory member is associated with a blocking member and is coupled with a controller and wherein the blocking member is shown in respective blocking and non-blocking positions.
Figure 14:
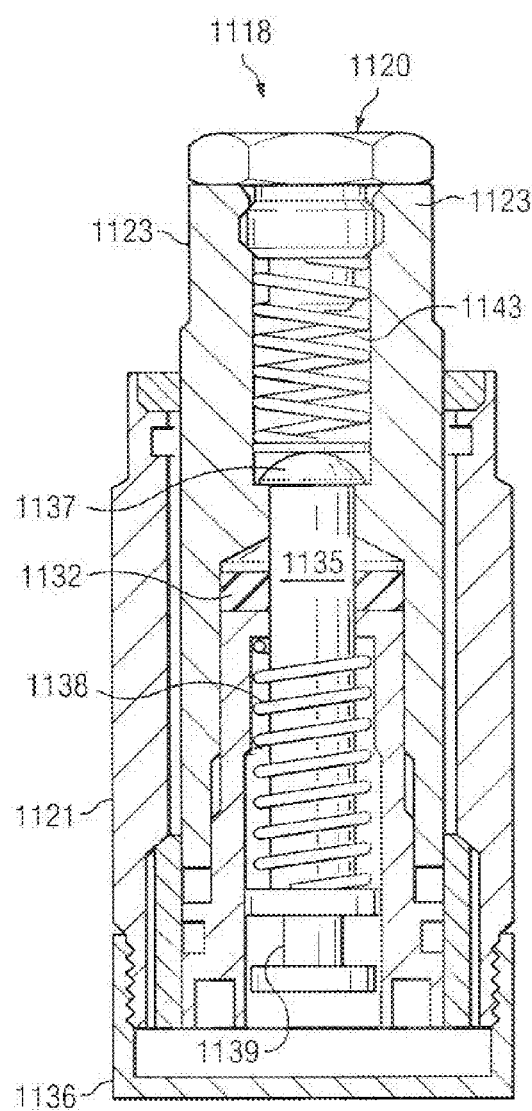

It will be appreciated, that a blocking assembly can be provided in any of a variety of suitable alternative arrangements. For example, as illustrated in FIGS. 13 and 14, in an alternative embodiment, a blocking assembly 1118 can be provided in a poppet-valve arrangement. In such an arrangement, the blocking assembly 1118 can include, a blocking member 1120, an outer casing 1121, an inner casing 1123, and a shaft 1135. The shaft 1135 can include a first end 1137 and a second end 1139. The blocking assembly 1118 can include a seal 1132 that is annularly disposed between the shaft 1135 of the blocking member 1120 and the inner casing 1123. The blocking assembly 1118 can also include a cap 1136 that is threaded on an end of the sleeve 1141 opposite the seal 1132. A shape memory member 1138 can be disposed between the seal 1132 and the second end 1139 of the shaft 1135. A resilient member 1143 can be contained within the inner casing 1123. When the shape memory member 1138 is contracted to the first length, the blocking member 1120 is in the blocking position, as illustrated in FIG. 13. If the shape memory member 1138 is extended to the second length, the blocking member 1120 moves to the non-blocking position, as illustrated in FIG. 14.

In one embodiment, the shape memory member 138 may be controlled by activation signals that are provided without use of a controller. For example, when the blocking assembly 118 is provided in fluid communication with the fluid receptacle 37 of the differential case 36 (e.g. as illustrated in FIGS. 2-4), differential fluid may contact the blocking assembly 118 such that the blocking assembly 118 can be maintained at the same temperature as the differential fluid. If the length of the shape memory member 138 is temperature-dependent, the blocking member 120 will be in the blocking position while the differential fluid is cool (e.g., prior to operation of the differential 32). However, during operation of the differential 32, as the temperature of the differential fluid rises, the temperature of the blocking assembly 118 can correspondingly rise. As the temperature of the blocking assembly 118 rises, the shape memory member 138 can extend to the second length thereby moving the blocking member 120 into the unblocked position.

Figure 15:
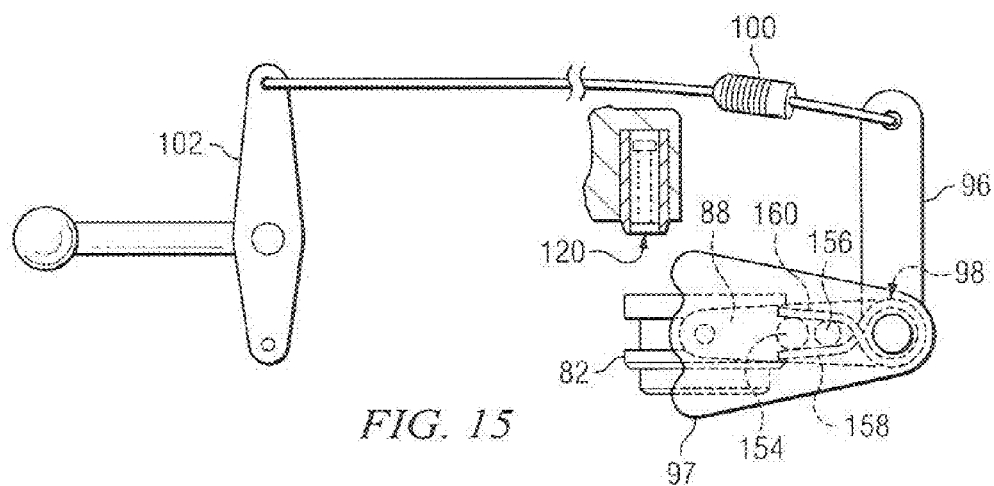
FIG. 15 is a schematic view of the selector coupled with the shift assembly of FIG. 8, wherein the selector is in an unlock-initiate position, the blocking member is in the non-blocking position, and the lock collar is in the unlocked position.
Figure 16:
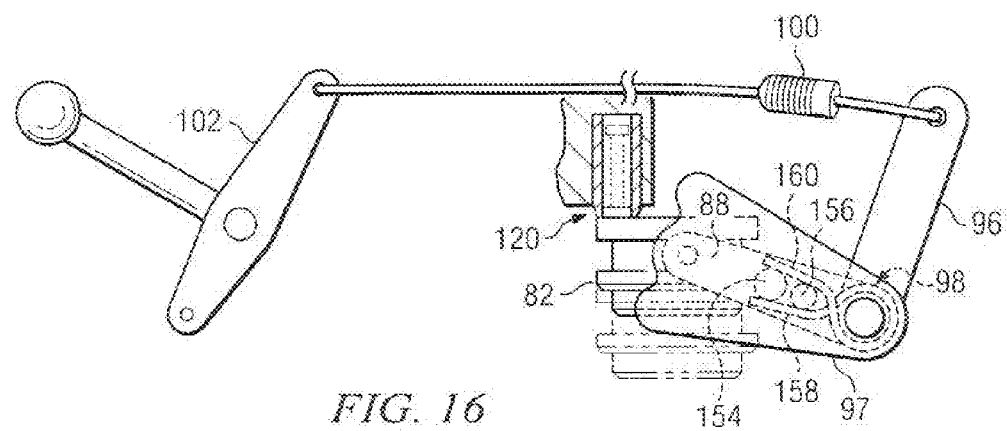
FIG. 16 is a schematic view of the selector coupled with the shift assembly of FIG. 8, wherein the selector is in a lock-initiate position, the blocking member is in the non-blocking position, and the lock collar is depicted to be moved to the locked position.
Figure 17:
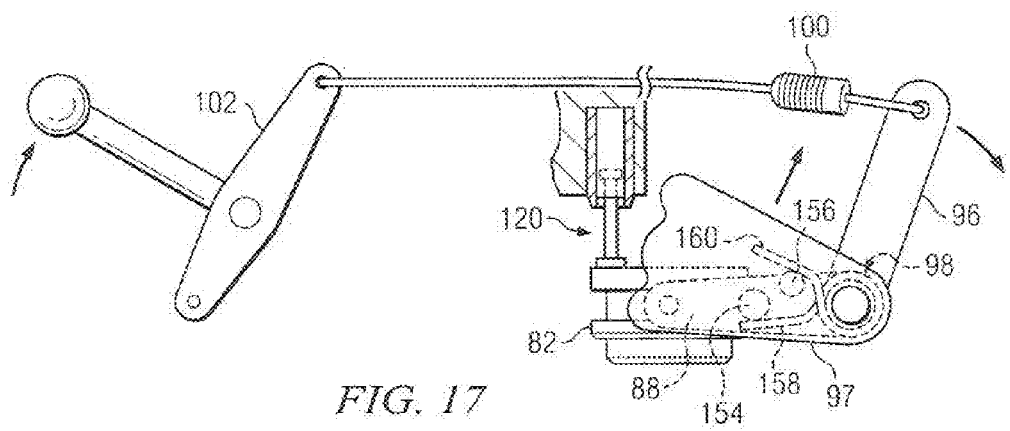
FIG. 17 is a schematic view of the selector coupled with the shift assembly of FIG. 8, wherein the selector is in the lock-initiate position, the blocking member is in the blocking position, and the lock collar is in the unlocked position.
Figure 18:
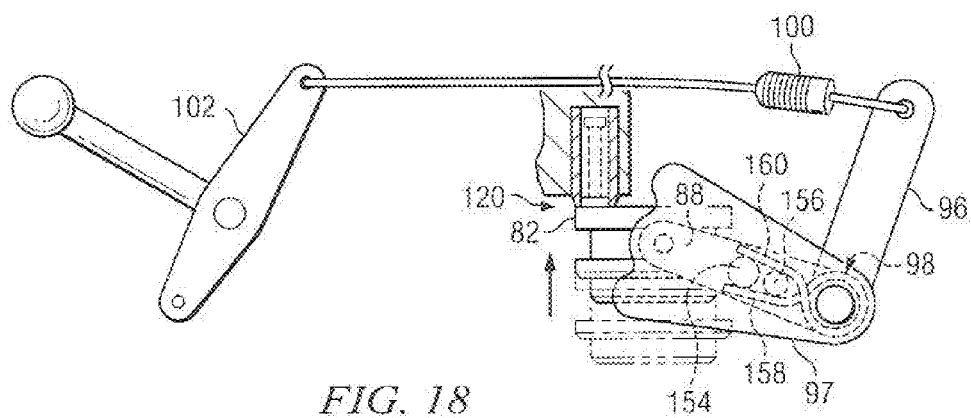
FIG. 18 is a schematic view of the selector coupled with the shift assembly of FIG. 8, wherein the selector is in the lock-initiate position, the blocking member is in the non-blocking position, and the lock collar is in the locked position.

During operation of the vehicle, an operator may shift the selector 102 to the lock-initiate position even though the blocking member 120 is in the blocking position. Similarly, during operation of the vehicle 10 with the lock collar 82 in the locked position and the selector 102 in the lock-initiate position, the lock collar 82 may be moved to the unlocked position by the blocking member 120 (e.g., when the axle speed exceeds the threshold value) while the selector 102 remains in the lock-initiate position. It will be appreciated therefore, that the differential lock 74 can be configured to permit the locking collar 82 to be in the unlocked position with the selector 102 in the lock-initiate position. In one embodiment, as illustrated in FIG. 15, the lock fork 88 of the differential lock 74 can include a protrusion 154 and the stop member 97 can include a protrusion 156. The resilient member 98 can include a pair of arms 158, 160 that engage the protrusions 154, 156. When the blocking member 120 is in the non-blocking position, as illustrated in FIGS. 15 and 16, movement of the selector 102 between the unlock-initiate position and the lock-initiate position moves the locking collar 82 between the respective unlocked position and the locked position. In particular, the pair of arms 158, 160 can restrain the protrusions 154, 156 in a substantially aligned arrangement (e.g., substantially aligned with respect to one another) such that movement of the shift arm 96 correspondingly moves the lock fork 88. However, it will be appreciated by comparing FIGS. 17 and 18, that when the blocking member 120 is in the blocking position, movement of the selector 102 into the lock-initiate position does not immediately move the lock collar 82 to the locked position. In such an arrangement, as illustrated in FIG. 17, when the selector 102 is moved to the lock-initiate position, the shift arm 96 rotates relative to the lock fork 88. Since the lock collar 82 is held in the unlocked position by the blocking member 120, the protrusions 154, 156 spread apart, thereby placing the pair of arms 158, 160 under tension. When the blocking member 120 is returned to the non-blocking position, as illustrated in FIG. 18, the pair of arms 158, 160 interacts with the protrusions 154, 156 to move the lock collar 82 to the locked position.

In one embodiment, the blocking member 120 can be configured to move the locking collar 82 from the locked position to the unlocked position when the axle speed rises above the threshold speed. For example, if the lock collar 82 is in the locked position (as illustrated in FIG. 3) and the axle speed rises above the threshold speed, the blocking member 120 can move from the non-blocking position to the blocking position to push the lock collar 82 to the unlocked position to unlock the differential 32.

Although the blocking assembly 118 has been shown to be associated with a lock collar, it will be appreciated that a blocking assembly can be associated with any of a variety of differential lock components. It will also be appreciated that a blocking assembly can additionally or alternatively prevent unlocking of a differential when movement of a differential lock could harm the differential.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An axle assembly comprising:
an axle;
a differential coupled with the axle and configured to facilitate operation of the axle at an axle speed;
a differential lock associated with the differential and movable between a locked position and an unlocked position, the differential lock comprising a lock collar and a shift arm; and
a blocking assembly associated with the differential lock and comprising:
a blocking member movable between a blocking position and a non-blocking position, wherein when the blocking member is in the blocking position, the differential lock is inhibited from moving to the locked position; and
a shape memory member coupled with the blocking member and configured to receive an activation signal, the shape memory member being configured for actuation between a first length and a second length in response to the activation signal, wherein actuation of the shape memory member between the first length and the second length facilitates movement of the blocking member between the non-blocking and blocking positions and wherein, with the differential lock in the locked position, movement of the blocking member from the non-blocking position to the blocking position facilitates movement of the differential lock into the unlocked position;
a selector coupled with the differential lock and movable between a lock-initiate position and an unlock-initiate position; and
a resilient member that facilitates coupling of the lock collar and the shift arm together, the resilient member having a pair of arms wherein one of the arms is coupled with the lock collar and the other of the arms is coupled with the shift arm; wherein:
the lock collar is radially supported by the axle and is slideable with respect to the axle between the locked position and the unlocked position;
the shift arm is coupled with the selector and is movable together with the selector;
the shift arm is selectively movable with respect to the lock collar; and
movement of the selector to the lock-initiate position with the blocking member in the blocking position facilitates movement of the shift arm with respect to the lock collar.

2. The axle assembly of claim 1 wherein the shape memory member is configured for actuation from the first length to the second length when a vehicular condition exceeds a threshold value.

3. The axle assembly of claim 2 wherein the vehicular condition comprises axle speed.

4. The axle assembly of claim 1 further comprising a controller coupled with the blocking assembly and configured to facilitate selective transmission of the activation signal to the shape memory member.

5. The axle assembly of claim 4 wherein the activation signal comprises an electrical current signal.

6. The axle assembly of claim 4 wherein transmission of the activation signal moves the blocking member to the blocking position.

7. The axle assembly of claim 1 wherein the shape memory member comprises a coiled member.

8. A vehicle comprising:
a motive power source;
an axle operably coupled with the motive power source;
a pair of wheels rotatably supported by the axle;
a differential coupled with the axle and configured to facilitate operation of the axle at an axle speed;
a differential lock associated with the differential and movable between a locked position and an unlocked position, the differential lock comprising a lock collar and a shift arm;
a selector coupled with the differential lock and movable between a lock-initiate position and an unlock-initiate position;
a blocking assembly associated with the differential lock and comprising:

a blocking member movable between a blocking position and a non-blocking position, wherein when the blocking member is in the blocking position, the differential lock is inhibited from moving to the locked position; and a shape memory member coupled with the blocking member and configured to receive an activation signal, the shape memory member being configured for actuation between a first length and a second length in response to the activation signal, wherein actuation of the shape memory member between the first length and the second length facilitates movement of the blocking member between the non-blocking and blocking positions; and a controller coupled with the blocking assembly and configured to facilitate selective transmission of the activation signal to the shape memory member; and a resilient member having a pair of arms wherein one of the arms is engaged with the lock collar and the other of the arms is engaged with the shift arm to facilitate coupling of the lock collar and the shift arm together; wherein:

the lock collar is radially supported by the axle and is slideable with respect to the axle between the locked position and the unlocked position;

the shift arm is coupled with the selector and is movable together with the selector;

the shift arm is selectively movable with respect to the lock collar;

movement of the selector to the lock-initiate position with the blocking member in the blocking position facilitates movement of the shift arm with respect to the lock collar; and with the differential lock in the locked position, movement of the blocking member from the non-blocking position to the blocking position facilitates movement of the differential lock into the unlocked position.

9. The vehicle of claim 8 further comprising a vehicular condition sensor coupled with the controller and configured to detect a vehicular condition.

10. The vehicle of claim 9 wherein the vehicular condition sensor comprises an axle speed sensor configured to detect an axle speed.

11. The vehicle of claim 8 wherein the shape memory member comprises a coiled member.

12. The vehicle of claim 8 wherein the activation signal comprises an electrical current signal.

13. The vehicle of claim 8 wherein transmission of the activation signal moves the blocking member to the blocking position.

* * * * *